United States Patent [19]
Kubicek

[11] 3,944,046
[45] Mar. 16, 1976

[54] ARTICLE TRANSFER APPARATUS
[75] Inventor: Edward A. Kubicek, Greentown, Ind.
[73] Assignee: General Motors Corporation, Detroit, Mich.
[22] Filed: Feb. 19, 1974
[21] Appl. No.: 443,602

[52] U.S. Cl. ................................. 198/21; 198/163
[51] Int. Cl.² ........................................ B65G 47/42
[58] Field of Search ............. 198/20 R, 21, 37, 163; 214/16.4 R, 16.4 C, 89

[56] References Cited
UNITED STATES PATENTS

| | | | |
|---|---|---|---|
| 1,920,981 | 8/1933 | Gibbs | 198/163 |
| 1,969,122 | 8/1934 | De Witt | 198/163 |
| 2,862,291 | 12/1958 | Clark et al. | 198/21 |
| 3,037,608 | 6/1962 | Rothschild | 198/163 |
| 3,224,564 | 12/1965 | Kay | 198/163 |
| 3,268,055 | 8/1966 | Stein et al. | 198/21 |
| 3,591,018 | 7/1971 | Nalbach | 198/163 |

Primary Examiner—Evon C. Blunk
Assistant Examiner—Jeffrey V. Nase
Attorney, Agent, or Firm—Edward J. Biskup

[57] ABSTRACT

An apparatus for transferring articles from a lower horizontal conveyor to an upper horizontal conveyor that includes a first drive means having a flexible carrier provided with lifter members arranged in horizontally spaced relationship for receiving articles from the lower conveyor and for moving the articles from a first position adjacent the lower conveyor to a second position adjacent the upper conveyor. Second drive means are provided which are operatively connected to the first drive means and also include a flexible carrier which has an ejector for discharging one article from the lifter members onto the upper conveyor when the article is in the second position. An electric motor is connected to the first and second drive means and is included in a circuit which has suitable switches for energizing the motor when an article is located in the first position and deenergizing the motor after an article is discharged by the ejector.

3 Claims, 3 Drawing Figures

ARTICLE TRANSFER APPARATUS

This invention concerns an article transfer apparatus that cooperates with a pair of horizontal conveyors for raising articles from one level to another.

In the manufacture of circuit boards of the type used for radios, plate-like metal pallets having holding clips on one surface are utilized with a machine which serves to move the pallets from station to station for insertion of electrical components into the clip supported circuit boards. The pallets are driven by a conveyor belt and when the circuit board is completely assembled, it is automatically removed from the pallet and the latter is returned to the first station of the machine. At the first station, the empty pallet is driven into an elevating device which raises the pallet to a higher level and drops it onto an upper conveyor belt of the machine preparatory to the receipt of a new circuit board.

The elevating device presently utilized for raising the pallet has a wide belt and roller drive which, through friction, turns, vertically orientates, and drives the pallet upwardly and drops it onto the upper conveyor. One problem experienced with the present elevating device is that maintenance cost is excessively high due to frequent roller replacement. In addition, it has been found that because the pallets are sandwiched between belts, they are subject to damage in that the holding clips are frequently torn off and, in some cases, the pallet is deformed due to the turning maneuver required by belt and roller arrangement.

Accordingly, the objects of the present invention are to provide a new and improved article transfer apparatus that has lifter members that contacts circuit board pallets at the bottom and sides only so as to prevent damage to the holding clips; to provide an improved elevating device for circuit board pallets that raises the pallets from one level to another while maintaining them horizontally orientated; to provide an improved article transfer apparatus that raises articles successively to a predetermined level and that incorporates an ejector which moves in a closed circular path for ejecting articles at the predetermined level from the apparatus to a receiving station; and to provide an improved article handling device which receives circuit board pallets from a lower conveyor and translates the pallets to a raised position wherefrom the pallets are automatically ejected onto an upper conveyor for movement to an electrical component injection machine.

In the preferred form the above objects and others are realized with an article transfer apparatus which is adapted to be combined with a pair of horizontal belt conveyors with one conveyor being located above the other. The apparatus includes an elevator device having first and second horizontally spaced sprocket wheels located adjacent the upper conveyor and third and fourth horizontally spaced sprocket wheels located adjacent the lower conveyor. A chain is entrained about the aforesaid sprocket wheels and has a plurality of uniformly spaced lifter members connected thereto. A second chain is combined with the first chain and is also provided with lifter members which are adapted to be horizontally aligned with and spaced from the lifter members of the first chain and cooperate therewith for supporting articles which are delivered to the apparatus by the lower conveyor. A chain driven ejector is operatively connected to the first and second chain and is adapted to remove one pallet from the lifter members and discharge it onto the upper conveyor when the pallet reaches a predetermined raised position. An electric motor connected to a suitable gear box serves to operate the apparatus and is energized and deenergized automatically through a pair of switches whenever a pallet is deposited by the lower conveyor into the apparatus and the lifter members raise the pallet a predetermined distance.

Other features and advantages of the present invention will be apparent from the following detailed description when taken with the drawings in which.

Figure 1:
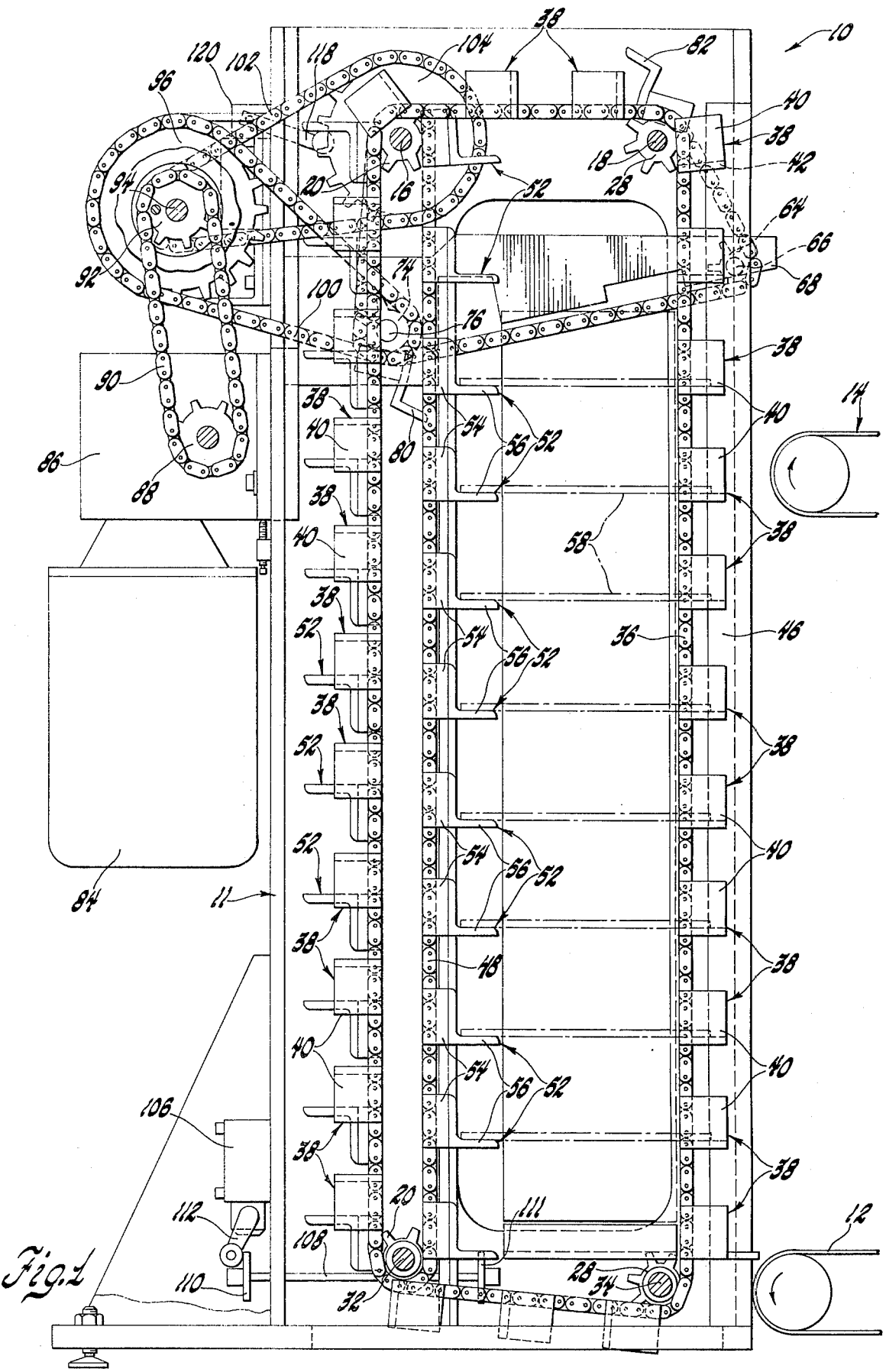
FIG. 1 is an elevational view showing the article transfer apparatus made according to the invention.
Figure 2:
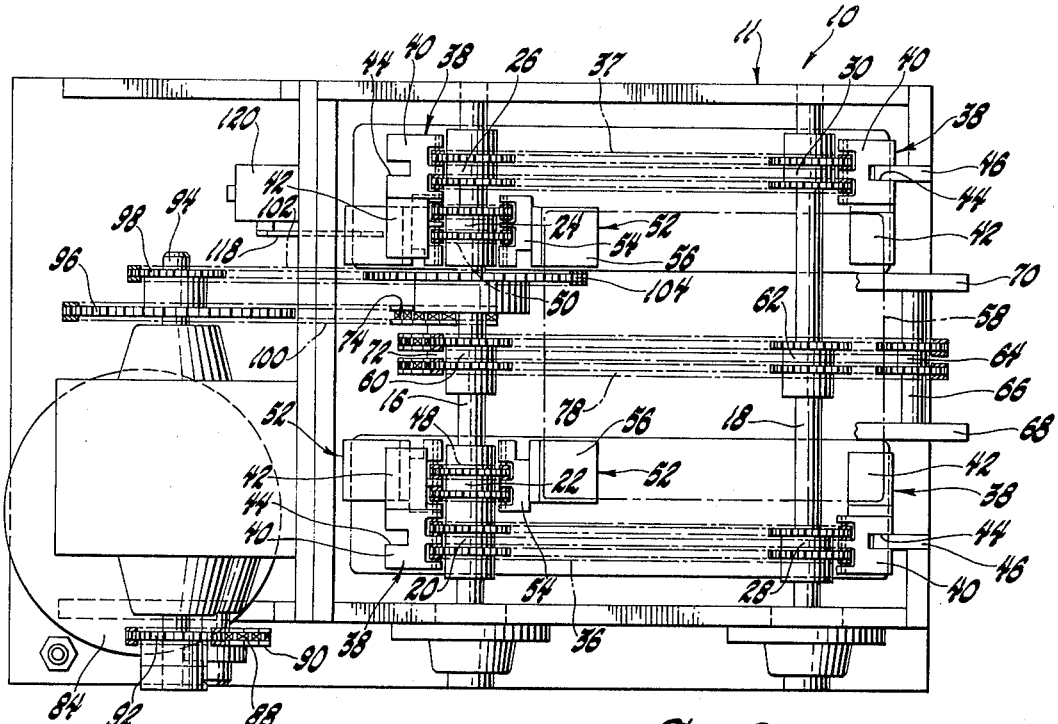
FIG. 2 is a plan view of the apparatus shown in FIG. 1.

Referring to the drawings and more particularly FIGS. 1 and 2, an article transfer apparatus 10 made according to the invention is shown comprising an upstanding base frame 11 which is positioned adjacent to a lower horizontal belt conveyor 12 and an upper horizontal belt conveyor 14. The conveyors 12 and 14 are part of an electrical component insertion machine which serves to move circuit board pallets between stations where electrical components are automatically inserted into the circuit board. The upper conveyor 14 operates in the direction shown and serves to move the pallets directly into the insertion machine while the lower conveyor 12 serves to return the empty pallets from the final station to the first station of the machine for receiving a new circuit board. The article transfer apparatus 10 is intended to receive the empty pallet and transfer it from the level of the lower conveyor 12 to an upper level wherein it is then discharged onto the upper conveyor 14 for movement to the first station of the machine.

It will be noted that the article transfer apparatus 10 comprises a pair of upper shafts 16 and 18 each of which is rotatably supported along parallel axes by the vertical side panels of the base frame 11. As best seen in FIG. 2, the shaft 16 rigidly supports identical double strand or dual sprocket wheels 20, 22, 24 and 26 while the shaft 18 rigidly supports identical sprocket wheels 28 and 30. The lower portion of the base frame 11 similarly supports a pair of parallel and horizontally spaced rotatable lower shafts 32 and 34, which although not shown, include double strand or dual sprocket wheels which are vertically aligned with and identically correspond to the aforementioned sprocket wheels on upper shafts 16 and 18 and shall hereinafter be referred to by the same reference numerals.

Entrained about the sprocket wheels 20 and 28 on shafts 16 and 18 respectively and the corresponding sprocket wheels 20 and 28 on shafts 32 and 34 respectively is an endless double strand chain 36. Similarly, a chain 37 identical to chain 36 is entrained about the sprocket wheels 26 and 30 on shafts 16 and 18, respectively, and the corresponding sprocket wheels on shafts 32 and 34. Each chain 36 and 37 serves as a flexible carrier for a plurality of identical lifter members 38 which are fastened along the entire length of the associated chain at uniformly spaced points.

As best seen in FIG. 2, each of the lifter members 38 comprises a mounting portion 40 and a support portion 42. The mounting portion 40 is connected to the chain and includes a slot 44 which cooperates with a vertical bar 46 fastened to the base frame 11 that serves as a guide means for the lifter members 38 as the latter move vertically upwardly in a manner to be described. It will be noted that the support portions 42 extend laterally inwardly and, as seen best in FIG. 1, have an upper support surface which is located in a horizontal plane. It will also be noted that the lifter members 38 connected with the chains 36 and 37 are arranged in pairs with the support surfaces of each set being in a horizontal plane. The lifter members 38 travel upwardly together when the shaft 16, as viewed in FIG. 1, is driven in a counterclockwise direction.

The sprocket wheels 22 on vertically aligned shafts 16 and 32 and the sprocket wheels 24 on shafts 16 and 32, respectively, have identical double strand endless chains 48 and 50 entrained thereabout. Each of the chains 48 and 50 is provided with a plurality of identical lifter members 52 each of which is also formed with a mounting portion 54 and a support portion 56. As in the case with the lifter members 38, the lifter members 52 are uniformly spaced along the entire length of the associated chain with the mounting portion 54 serving as a chain connecting means while the support portion 56 being provided with a flat upper surface which, as seen in FIG. 1, is horizontally aligned with the flat upper surfaces of a set of lifter members 38. Thus, it will be understood that inasmuch as the sprocket wheels 22 and 24 are rigidly connected to the same shaft as the sprocket wheels 20 and also because they are identical, the chains 36, 37 and 48, 50 move synchronously for maintaining the horizontal alignment of the lifter members 38 and 52. It will also be understood that the support portions of a pair of lifter members 38 and a pair of lifter members 52 serve as seats for the four corners of a pallet 58 as shown in phantom lines in FIG. 2.

As seen in FIG. 2, the shafts 16 and 18 are respectively provided with double strand or dual sprocket wheels 60 and 62 each of which is located midway between the ends of the associated shaft. Each of the sprocket wheels 60 and 62 is freely rotatably mounted to the accommodating shaft and a third double strand or dual sprocket wheel 64 is located below and forwardly of the sprocket wheel 62 and is also freely rotatably supported by a shaft 66 the ends of which are supported by vertical plate members 68 and 70 of the base frame 11. A double strand drive sprocket wheel 72 is located vertically below and slightly to the rear of sprocket wheel 60 and is rigidly mounted together with a single strand sprocket wheel 74 on a shaft 76. An endless chain 78 is entrained about the identical sprocket wheels 60, 62, 64 and 72 and supports a pair of identical ejector elements 80 and 82 which are generally L-shaped in cross section. The ejector elements 80 and 82 are connected to chain 78 at points thereon so that the extent of chain measured in a clockwise direction from the ejector element 80 to the ejector element 82 is equal to the extent of chain from ejector element 82 to ejector element 80. One or the other ejector element serves to engage the upper most pallet 58 when the latter reaches the position shown in FIG. 1 and causes the pallet to be discharged onto the upper conveyor 14 for movement to the insertion machine. The arrangement is such that as each pallet 58 is raised a distance equal to the vertical spacing between the support surfaces of adjacent lifter members 38 and 52, the ejector chain 78 is driven a distance so that the ejector elements 80 and 82 are transposed in position. In other words, as seen in FIG. 1, ejector element 80 will be located in the position occupied by ejector element 82 and vice versa.

In order to realize the movement of the ejector elements and lifter members as explained above, a drive system is provided which includes an electric motor 84 the output shaft of which is connected through a gear reducer 86 to a single strand drive sprocket 88. As seen in FIG. 2, the sprocket 88, in turn, is drivingly connected through an endless chain 90 to a similar single strand sprocket wheel 92 rigidly mounted on one end of a horizontally orientated rotatable shaft 94 the other end of which rigidly supports axially spaced single strand sprocket wheels 96 and 98. The sprocket wheel 96 is connected through a chain 100 to the sprocket wheel 74 on shaft 76 while the sprocket wheel 98 is connected through a chain 102 to a single strand sprocket wheel 104 fixed with the shaft 16. There is a gear ratio of 5 to 1 between the sprocket wheels 96 and 74 and a gear ratio of 1 to 5 between the sprocket wheels 98 and 104. Thus, when the horizontally aligned lifter members 38 and 52 move a distance equal to the vertical spacing between the adjacent lifter members, the ejector element 80 is driven from the position shown in FIG. 1 to the position of element 82 and at the same time such movement causes the pallet 58 in the uppermost position to be ejected from the lifter members onto the upper conveyor 14.

Figure 3:
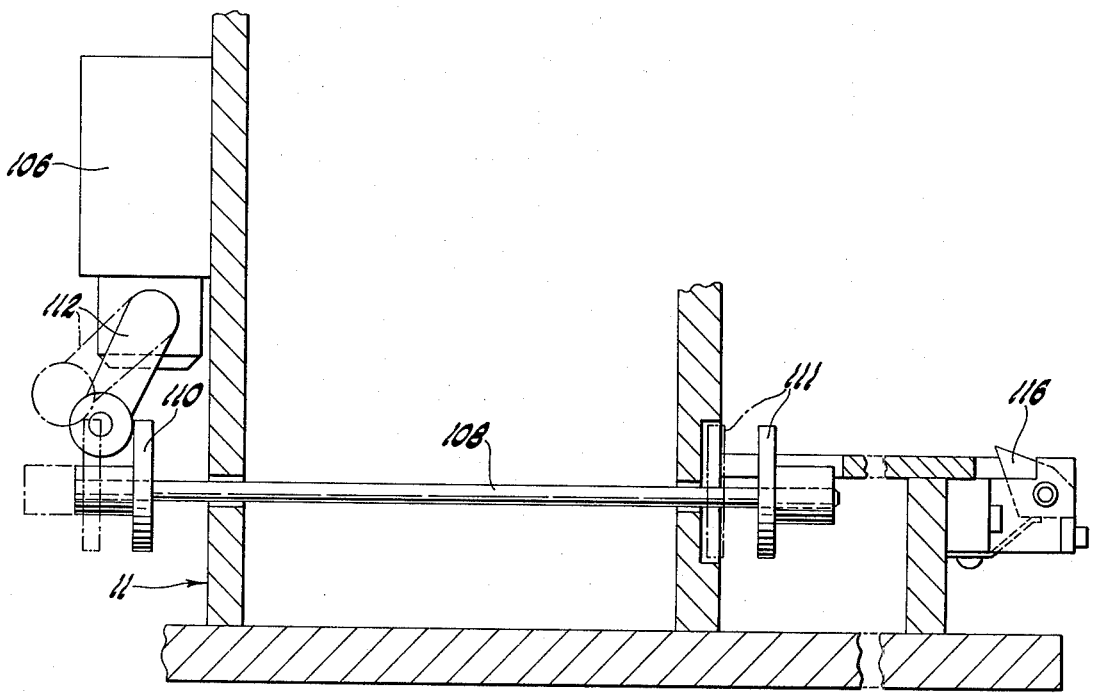
FIG. 3 is an enlarged view of the actuator which serves to energize the electric motor incorporated with the apparatus of FIGS. 1 and 2.

The movement described above is intermittent and only occurs when a pallet 58 is deposited into the lower most lifter members 38, 52 by the lower conveyor 12. In this regard, it will be noted that each pallet 58 is made of a metal such as aluminum and has sufficient weight so when the belt conveyor 12 is traveling at a relatively high speed, the pallet is literally thrown into the lower section of the apparatus which is in line with the conveyor. As the pallet 58 enters the article transfer apparatus 10, one end thereof will cause a switch 106 to be tripped so as to energize the electric motor 84. As seen in FIG. 3, the actuating mechanism for tripping the switch 106 includes an axially displaceable rod 108 one end of which is provided with a contact plate 110 and the other end has a contact plate 111. The switch 106 is mounted to the base frame 11 and has a spring biased switch arm 112 which maintains engagement with the contact plate 110 of the actuator mechanism and serves to normally position the rod 108 as shown in full lines of FIG. 3. When the pallet 58 enters the lower level of the article transfer apparatus 10, it engages the contact plate 111 at the opposite end of the rod 108 and moves the latter to the left causing the switch arm 112 to be moved to the phantom line position to close the circuit to the electric motor 84. A spring latch 116 retains the pallet 58 in position and as the electric motor 84 is energized the pallets 58 are raised by the lifter members 38, 52 and the uppermost pallet is simultaneously discharged onto the upper conveyor 14 by the ejector element 80 or 82. The electric motor 84 continues to drive the elevating portion and the ejector portion of the article transfer apparatus 10 until the support portion 56 of one of the lifter members 52 mounted on the chain 48 engages the arm 118 of a limit switch 120 mounted at the upper end of the base frame 11. When this occurs the electric motor 84 is deenergized and a cycle is completed.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In combination with a pair of horizontal conveyors with one conveyor being located above the other conveyor, apparatus for transferring articles from the lower horizontal conveyor to the upper horizontal conveyor, said apparatus being positioned to one side of said conveyors and comprising an upstanding relatively narrow frame supporting an elevator device having first and second horizontally spaced sprocket wheels located adjacent the upper conveyor, third and fourth horizontally spaced sprocket wheels located adjacent the lower conveyor, the first and third sprocket wheels being vertically aligned, fifth and sixth sprocket wheels rigidly connected to and axially aligned with the first and third sprocket wheels respectively, a first chain entrained about said first, second, third, and fourth sprocket wheels and having a plurality of lifter members uniformly spaced a predetermined distance from each other and connected to the first chain along the length thereof, a second chain entrained about said fifth and sixth sprocket wheels and having a plurality of lifter members connected thereto that are uniformly spaced at distances equal to the predetermined distance between the lifter members on said first chain, all of said sprocket wheels being identical and being so arranged that when one of said sprocket wheels is driven the lifter members of said first and second chains are horizontally aligned in pairs along a plane perpendicular to the rotational axes of the fifth and sixth sprocket wheels for supporting vertically spaced articles, an ejector, said ejector comprising a third chain and a plurality of sprocket wheels located within the confines of said frame, said third chain being entrained about said last mentioned sprocket wheels and having at least one ejector element secured thereto for movement in a closed path and for engaging one article carried by one pair of said lifter members located at an elevation higher than said upper conveyor for discharging the article onto the upper conveyor, a motor, and means drivingly connecting the motor to the first, second and third chains whereby the ejector and lifter members move synchronously so when each horizontally aligned pair of said lifter members are raised a distance equal to said predetermined distance the ejector causes said one article to be discharged from said one pair of the lifter members onto the upper conveyor.

2. In combination with a pair of horizontal belt conveyors with one conveyor being located above the other conveyor, apparatus for transferring articles from the lower horizontal conveyor to the upper horizontal conveyor, said apparatus being positioned to one side of said conveyors and comprising an upstanding relatively narrow frame supporting an elevator device having first and second horizontally spaced sprocket wheels located adjacent the upper conveyor, third and fourth horizontally spaced sprocket wheels located adjacent the lower conveyor, the first and third sprocket wheels being vertically aligned, fifth and sixth sprocket wheels rigidly connected to and axially aligned with the first and third sprocket wheels respectively, a first endless chain entrained about said first, second, third and fourth sprocket wheels and having a plurality of lifter members uniformly spaced a predetermined distance from each other and connected to the first chain along the length thereof, a second endless chain entrained about said fifth and sixth sprocket wheels and having a plurality of lifter members connected thereto that are uniformly spaced at distances equal to the predetermined distance between the lifter members on said first chain, all of said sprocket wheels being identical and being so arranged that when one of said sprocket wheels is driven the lifter members of said first and second chains are horizontally aligned in pairs along a plane perpendicular to the rotational axes of the fifth and sixth sprocket wheels for supporting vertically spaced articles, a chain-driven ejector, said ejector comprising a third endless chain and a plurality of sprocket wheels located within the confines of said frame, said third chain being entrained about said last mentioned sprocket wheels which include seventh and eighth sprocket wheels that rotate about the same axes as the first and second sprocket wheels respectively, at least one ejector element secured to said third chain for movement in a closed path and for engaging one article carried by one horizontally aligned pair of lifter members located at an elevation higher than said upper conveyor for discharging the article onto the upper conveyor, a motor, means drivingly connecting the motor to the first, second and third chains whereby the ejector and lifter members move synchronously so when each horizontally aligned pair of said lifter members are raised a distance equal to said predetermined distance the ejector causes said one article to be discharged from said one pair of the lifter members onto the upper conveyor, and control means including a first switch means located in axial alignment with said lower conveyor and actuated by a article deposited by the lower conveyor into the apparatus for energizing the electric motor and a second switch means actuated by said lifter members for deenergizing said electric motor after the article is raised by the accommodating lifter members a distance equal to said predetermined distance.

3. The combination as set forth in claim 2 wherein said first switch means includes an axially displaceable rod having a contact plate located between the third and fourth sprocket wheels.

* * * * *